United States Patent [19]

Scarlett et al.

[11] 4,384,608

[45] May 24, 1983

[54] REVERSE CYCLE AIR CONDITIONER SYSTEM

[75] Inventors: John A. Scarlett, South Pasadena, Fla.; Joseph R. Akerman, Ann Arbor, Mich.

[73] Assignee: Ford Motor Company, Dearborn, Mich.

[21] Appl. No.: 176,835

[22] Filed: Aug. 11, 1980

[51] Int. Cl.³ .................... B60H 3/04; F25B 13/00
[52] U.S. Cl. ........................ 165/43; 165/29; 62/243; 62/324.6; 137/625.43
[58] Field of Search ............ 165/23, 29, 43, 51; 62/243, 244, 160, 324.1, 324.6, 324.7; 237/2 B, 12.3 A; 137/625.43

[56] References Cited

U.S. PATENT DOCUMENTS

| | | | |
|---|---|---|---|
| 2,585,748 | 2/1952 | De Silvestro | 62/6 |
| 2,638,123 | 5/1953 | Vargo | 137/625 |
| 2,806,358 | 9/1957 | Jacobs | 62/117.1 |
| 2,806,674 | 9/1957 | Biehn | 165/29 |
| 2,829,869 | 4/1958 | Philipp | 165/43 |
| 2,988,896 | 6/1961 | Swart | 62/156 |
| 2,995,345 | 8/1961 | Manetta et al. | 165/29 |
| 3,006,613 | 10/1961 | Coyne | 165/29 |
| 3,141,498 | 7/1964 | Roane | 165/43 |
| 3,171,474 | 3/1965 | Roane | 165/43 |
| 3,283,809 | 11/1966 | Eberhart | 165/29 |
| 3,286,765 | 11/1966 | Jentel | 165/43 |
| 3,444,699 | 5/1969 | Harnish | 62/225 |
| 3,496,855 | 2/1970 | De Boer | 165/42 |
| 4,102,391 | 7/1978 | Noland et al. | 165/29 |
| 4,123,916 | 11/1978 | Kreger | 62/243 |
| 4,306,422 | 12/1981 | Korycki | 62/324.6 |

FOREIGN PATENT DOCUMENTS 54-137843 10/1979 Japan .

Primary Examiner—Samuel Scott
Assistant Examiner—Margaret A. Focarino
Attorney, Agent, or Firm—Frank G. McKenzie; D. J. Harrington

[57] ABSTRACT

A compression air conditioning system adapted to cool air within the passenger compartment of a motor vehicle can be reversed to function as a heat pump for heating the compartment. The system includes a first heat exchanger located within the compartment wherein the refrigerant is vaporized in the air conditioning mode and condensed during the heating mode. An electrical resistance heater is energized for a short period after starting the engine during which time the various heat sources may be inadequate to heat the passenger compartment air sufficiently. A diverter valve regulates flow through the refrigerant lines so that flow in either the heating or cooling mode is always in the same direction through the lines and the system components. A second heat exchanger located outside the compartment operates as a condenser during the cooling cycle and as an evaporator during the heating cycle. Three sources of heat energy can be used within the second exchanger to heat the refrigerant. The engine exhaust gas and primary engine coolant can be used to heat ambient air, which is carried to the second exchanger to heat the refrigerant when outside temperatures are so low that the refrigerant is not adequately heated from the atmosphere.

3 Claims, 1 Drawing Figure

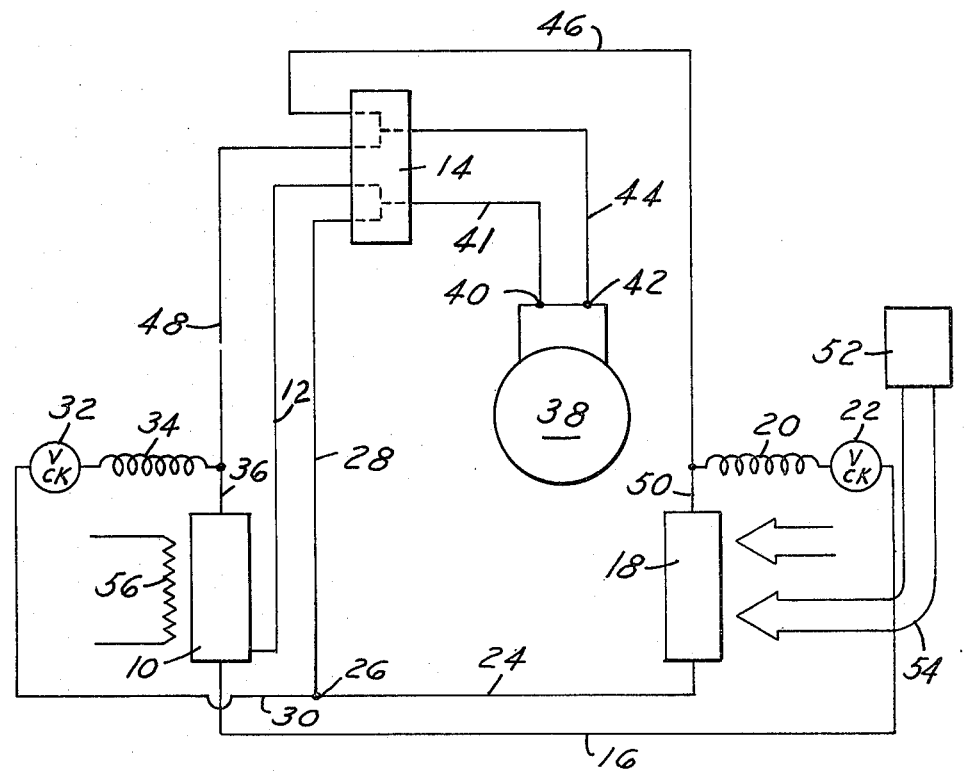

REVERSE CYCLE AIR CONDITIONER SYSTEM

BACKGROUND OF THE INVENTION

1. Field of the Invention

This invention relates to a reverse cycle refrigeration system that may operate as an automotive heater or air conditioner. More particularly, the invention pertains to such a system wherein the waste heat from the primary engine coolant and from the engine exhaust gas system are used as heat sources during the heat pump operation.

2. Description of the Prior Art

The heat pump is a device which uses heat energy absorbed by a refrigerant at a low energy state and delivered at high temperature to heat a space after having mechanical work applied. It is known from the prior art that an air conditioning system can be reversed in operation for heating rather than cooling. U.S. Pat. Nos. 3,171,474, 3,141,498, 2,585,748 and 2,806,674 describe the use of an air conditioning system as a reversible heat pump for the purposes of cooling or heating the passenger compartment of a motor vehicle. A recognized difficulty with a reverse cycle system is the tendency to accumulate frost on the evaporator coils during certain periods when atmospheric conditions enhance the possibility of frost accumulation. The prior art has been concerned with adapting heat pump systems to prevent accumulation of frost by various means. U.S. Pat. Nos. 2,988,896, 3,444,699, 3,283,809 and 4,102,391 employ various means either for preventing the accumulation of frost, sensing its presence or dissipating the frost.

Except in regions of mild winter temperature, the outside winter air is not in general a sufficient, low temperature source of heat for a heat pump system. In addition to the operating cost for power and maintenance, there are fixed costs for the equipment of the heat pump, which substantially exceed similar costs for a conventional heating system. Consequently, it is difficult to justify these unless there is need of using the same equipment for cooling in summer.

In conventional practice the passenger compartment of a motor vehicle is heated by heat taken from the primary engine coolant in a radiator. Within the compartment, room temperature air is forced through the heater to enhance the efficiency of the heat exchange. It is recognized that small passenger vehicles, particularly those having efficient engines adapted to deliver high gas mileage, wherein the exhaust gas is recirculated through the engine have an insufficient quantity of waste heat from the coolant to satisfy the requirements for passenger comfort. For example, it has been estimated that perhaps only one-third of the heat load required to maintain the compartment at an average 70° Farenheit temperature can be supplied from the primary coolant of an engine having the efficiency required in future vehicles.

SUMMARY OF THE INVENTION

The air conditioning system according to this invention for heating and cooling the passenger compartment of an automotive vehicle includes a first heat exchanger located within the compartment for transferring heat between the refrigerant and the air within the compartment. A second heat exchanger is adapted to transfer heat between the refrigerant and the ambient outside air or air preheated from the primary engine coolant or from the waste heat in the engine exhaust gas system. A compressor is driven by an electrical motor from the engine of the vehicle. A diverter valve communicates its inlet side with the discharge side of the compressor and is adapted to direct refrigerant from the compressor to either the first or second heat exchangers. The diverter valve is adapted to receive high pressure refrigerant from either the first or second heat exchangers and to direct the refrigerant to the suction side of the compressor. A second portion of the diverter valve directs the liquified compressed refrigerant from the pressure side of the compressor to either the first or second heat exchangers depending on whether the system is operating as an air conditioner or as a heat pump. When the exterior air temperature is so low that the refrigerant cannot receive heat enough from this source to maintain passenger comfort during the heating mode of operation additional sources of heat may be used. For example, the primary engine coolant can be used to preheat ambient air or the engine exhaust gas can exchange its heat to the ambient air. Air preheated from either or both of these sources is then used either to augment or to replace outdoor air as the heat source for heating the refrigerant in the evaporator.

It is possible during winter use when ambient temperature is so low as to inadequately heat the refrigerant and during engine starting conditions, and a short period thereafter, that the waste heat available in the coolant and the exhaust gas system may also be inadequate to maintain passenger comfort. In this instance, the compressor will be underloaded and will not require the full capacity of the electrical system to deliver electrical energy. The refrigerant delivered to the compressor will be at least partially unvaporized and in the liquid state. Therefore, the mechanical work done within the compressor is far less than the work required if the refrigerant were fully vaporized. The electrical energy required to drive the compressor is correspondingly less. When this situation prevails, the excess capacity of the electrical system to produce electrical current not required by the compressor can be applied to energize a resistance strip heater mounted preferably within the condensor and across which passenger compartment air is forced to produce a heat exchange. In this start-up condition, heat from the electrical source adds to the heat derived from the heat pump without requiring that the electrical system be oversized in relation to its normal operating requirements.

BRIEF DESCRIPTION OF THE DRAWING

In the drawings of the refrigeration system according our invention is shown certain operative components located on one side or the other of a line schematically separating the interior of the passenger compartment from the exterior. Although the separation indicated places the various components as they would be located in conventional practice, the system will function as intended provided one heat exchanger is located inside and the other outside.

DESCRIPTION OF THE PREFERRED EMBODIMENT

Referring to the FIGURE, a compression refrigeration system is shown having refrigerant-carrying passages, conventionally of copper tubing, connecting various elements of the system. A first heat exchanger 10, which functions as an evaporator when the system is cooling the passenger compartment and as the condenser when functioning as a heat pump, is shown located within the interior of the vehicle. One refrigerant line 12 communicates the outlet side of the first exchanger to an inlet of one portion of a flow direction diverter valve 14.

A second refrigerant line 16 communicates the outlet side of the first exchanger 10 to the inlet side of a second heat exchanger 18. The second heat exchanger, which functions as a condenser when the system is cooling the passenger compartment and as an evaporator when the system functions as a heat pump, is preferably located externally of the passenger compartment. Line 16 first carries refrigerant to an expansion valve or capillary 20 before being admitted to the second exchanger. A check valve 22 interposed between expansion valve 20 and the first exchanger 10 allows the refrigerant to flow in the direction from the first to the second heat exchangers, but prevents flow in the opposite direction.

Refrigerant line 24 communicates the outlet side of the second exchanger 18 with a tee fitting 26 where lines 28, 30 join line 24 and communicate line 24 with the diverter valve 14 and a second check valve 32, respectively. A second expansion valve or capillary 34 is interposed between the second check valve 32 and the hydraulic line 36 that carries refrigerant to the inlet side of the first heat exchanger 10. Similarly, check valve 32 allows refrigerant to flow from the second to the first heat exchangers 18, 10, but prevents the flow of refrigerant in the reverse direction.

A compressor 38 driven by the engine (not shown) of the vehicle has its inlet or suction side 40 connected by a hydraulic line 42 to the outlet of that portion of diverter valve 14 that is supplied with refrigerant from either refrigerant line 28 or 12. The outlet or pressure side 42 of the compressor is connected by line 44 to a second portion of the flow diverter valve 14. Diverter valve 14 is adapted to direct the pressurized refrigerant delivered from the compressor through line 44 either to refrigerant line 46 or 48. Line 46 communicates the outlet side of the second portion of diverter 14 to the inlet side of the second heat exchanger 18. Heat exchanger 18 may be adapted to have a single inlet fitting connected to the outlet side of the expansion valve 20 and refrigerant line 46. Line 48 communicates the outlet side of the second portion of diverter 14 with the common inlet fitting 36, which is connected to the outlet of second expansion valve 34 and the inlet of the first heat exchanger 10.

Diverter valve 14 has two distinct portions, one associated with its outlet connected by line 41 to the suction side of the compressor, the other associated with the inlet communicating through line 44 with the pressure side of the compressor 38. Valve 14 operates with regard to the first portion by directing refrigerant carried to its inlet side by either lines 12 or 28 to the suction side of the compressor. With regard to the second portion of diverter valve 14, refrigerant supplied to its inlet side by refrigerant line 44 is diverted either to line 46 or 48. Of course, the line to which the pressurized refrigerant will be directed or from which refrigerant is received in the diverter valve 14 will depend on whether the system is operating to heat or to cool the passenger compartment. Whether operating as an air conditioning system or as a heat pump, the flow of refrigerant through the compressor, the heat exchangers 10, 18, the diverter valve 14 and the hydraulic lines is always in the same direction.

Air at ambient outdoor conditions is supplied to and flows through the second heat exchanger 18 regardless of whether the system is operating to heat or cool the passenger compartment. However, exhaust gas from the engine may be diverted from the exhaust system of the vehicle and caused to flow through the second heat exchanger 18 when the system is operating in the reverse cycle as a heat pump. Heat is taken from the exhaust gases in this way in order to augment the heat exchange occurring between the refrigerant and the ambient air, particularly when outside air has a low temperature insufficient to heat the passenger compartment.

Alternatively, waste heat from the engine cooling system may be used as the heat source. In this instance, the coolant is chilled in a radiator 52 and normally exchanges its heat with the ambient air that is allowed to leave the vehicle and return to the atmosphere. However, in our system the outdoor air after being heated by the coolant in the radiator may be carried in an air duct 54 to the second heat exchanger 18 through which it flows and in which a heat exchange takes place whereby the refrigerant is heated and the air cooled.

The first heat exchanger 10 is adapted for use during the air conditioning cycle to have air from the inside of the passenger compartment pass through the exchanger 10 wherein the refrigerant is heated and the air cooled. Generally, the air will be forced by a fan driven by a motor through the coils of the first heat exchanger in order to increase the efficiency of heat exchanger 10.

An electrical resistance strip heater 56 is located adjacent the coil of the heat exchanger 10 and receives electrical power through an electrical circuit wherein the resistance heater is in parallel with the motor (not shown) that drives the compressor. With the system operating in the heating mode when outdoor temperatures are low, there may be insufficient heat from the atmosphere to heat the temperature of the passenger compartment to the desired temperature. The waste heat from the engine whether taken from the primary engine cooling system or from the exhaust engine gas may not be a sufficient source of heat for the compartment at least until sufficient running time has elapsed and the engine has come up to temperature. During this interim period, the compressor is underloaded; therefore, electrical energy unneeded to drive the compressor is available for other purposes. When our system is operating in the heating mode, a compressor amperage coil (not shown) permits the surplus electrical energy to be diverted to the electrical resistance heater 56 whereby a rapid transfer of heat energy to the refrigerant will occur. As the compressor requires additional load causing the electrical motor to draw more current, the amperage solenoid disengages thereby opening the circuit and deenergizing the resistance heater. After this time, heat from the engine coolant or the exhaust system will augment the heat recovered from outdoor air and the system will operate in its usual manner.

When operating in the air conditioning cycle, liquid refrigerant is vaporized in the evaporator 10 and thereby absorbing heat from the passenger compartment air, which is forced through the heat exchanger 10. Low pressure vapor from the evaporator 10 flows through the refrigerant line 12 to the diverter valve 14, which is positioned to direct flow to the suction side 40 of the compressor 38. In the compressor the refrigerant is raised in pressure and temperature and is delivered from the compressor through the line 44 back to diverter valve 14. Valve 14 is arranged to direct flow of refrigerant through line 46 and inlet fitting 50 to the condenser 18. Pressure at which refrigerant is delivered to the condenser may be approximately 195 psia and the temperature 200° F.

Ambient air whose temperature may be 100° F. is forced through the coil of the condenser 18 whereby an exchange of heat occurs between the air and the refrigerant causing the refrigerant to cool to approximately 120° F., its pressure remaining at 195 psia. In transferring its heat to the outside air in the condenser 18, the refrigerant undergoes a change of phase to the liquid state.

The high pressure refrigerant then passes through the hydraulic lines 24, 30 and through the check valve 32, which is opened during the refrigeration cycle to admit flow of refrigerant through the expansion valve 34. Within expansion valve 34, the refrigerant throttles to the evaporator pressure. In passing through the expansion valve the liquid refrigerant cools, perhaps to 40° F., and as a consequence of the throttling process its pressure is reduced to about 50 psia. The cold refrigerant then enters the inlet fitting 36 which directs it through the coil of the evaporator 10. The air within the passenger compartment is forced through the coils and a heat exchange takes place whereby the refrigerant is heated and the air is cooled. The flow rate of air through the evaporator will be about 200 cubic feet per minute.

Either a dichlorodifluoromethane such as Freon-12, monochlorodifluoromethane such as Freon-22, or trichloromonofluoromethane such as Freon-11, can be used in our system. The pressures and temperatures of the refrigerant throughout the system will, however, vary depending upon the refrigerant used, the pressure drops in the system, the ambient conditions and the desired temperatures.

When the system is operating in the air conditioning mode, the first check valve 22 is closed. Therefore, refrigerant exiting the evaporator 10 does not flow through the line 16, but rather through the refrigerant line 12 which carries it to the diverter valve 14.

When the system is operating in the reverse cycle as a heat pump to heat the passenger compartment, check valve 22 is opened and valve 32 closed. Therefore, refrigerant from the exchanger 18 flows to diverter valve 14 rather than to heat exchanger 10. Liquid refrigerant leaving the condenser 10 at approximately 160° F. and 280 psia is carried in line 16 through check valve 22 to the first expansion valve 20. In passing through expansion valve 20 the refrigerant expands into the coil of the evaporator.

Outside air is forced through the evaporator at approximately 1000 cubic feet per minute whereby the air is cooled and the refrigerant heated to approximately 22° F. at 36 psia. Alternatively, when the temperature of the outdoor air is so low that the passenger compartment cannot be adequately heated, heat can be pumped from the primary engine coolant by circulating the coolant through the radiator 52. Ambient outdoor air receives heat from the coolant and instead of being dissipated to the atmosphere, is directed in the air duct 54 and forced through the evaporator 18. A third potential source of heat for the system is the waste heat normally delivered to the atmosphere in the form of engine exhaust gases. The system can be adapted to produce an exchange of heat between the exhaust gases and the ambient air in a heat exchanger (not shown). The air so heated can be delivered through the air duct 54 and forced through the evaporator 18.

The vaporized refrigerant leaves the evaporator 18 through the line 24 wherein it is directed through the line 28 to the diverter valve 14. Valve 14 is arranged to direct the flow of vaporized refrigerant through line 41 to the suction line 40 of the compressor 38. In the compressor, mechanical energy is added to raise the pressure and temperature of the refrigerant to about 260° F. and 280 psia. The hot refrigerant is discharged from the compressor through line 44 which carries it to diverter valve 14. Since the system is operating as a heat pump, diverter 14 is disposed to direct flow through line 48 through the inlet fitting 36 to the condenser 10. Within the condenser, the refrigerant gives up superheat and the heat of vaporization to the passenger compartment air, which is forced at 200 cubic feet per minute through the condenser.

When the outdoor temperature is so low that the refrigerant is not heated sufficiently in the evaporator, or if the engine coolant or engine exhaust gas temperatures are so low that the refrigerant is inadequately heated, the refrigerant will not be evaporated in the evaporator 18 but will be delivered to the suction side of the compressor either entirely or in large part still in the liquid phase. In this instance, the compressor is required to do less work on the refrigerant since a phase change is only partially involved. Consequently, the power required to drive the compressor is less than if the source of heat were at a higher temperature and the refrigerant fully vaporized. When the compressor 38 is underloaded in this way, the excess electrical current otherwise drawn by the electric motor that drives the compressor can be used to energize the electrical resistance heater 56, which may be housed in the same unit as the condenser 10. In this case, when the passenger compartment air is forced through the condenser the air is heated partially by an exchange of heat between the refrigerant and the air and partially by the air passing over and drawing heat from the resistance heater.

In normal operation during the heat pump cycle, the refrigerant leaves the condenser 10 at approximately 160° F. and 280 psia at which conditions it is delivered back through the check valve 22 and the first expansion valve 20.

Having thus described preferred embodiments of our invention, what we claim and desire to secure by U.S. Letters Patent is:

1. An air conditioning system employing a circulating refrigerant for heating and cooling the passenger compartment of an automotive vehicle comprising:
   a first heat exchanger adapted to transfer heat between the refrigerant and air within the compartment;
   a second heat exchanger adapted to transfer heat between the refrigerant and air without the compartment;
   a compressor adapted to receive low pressure refrigerant from the first and second heat exchangers and to deliver high pressure refrigerant to the system;
   diverter valve means including a first portion having its inlet side connected to the discharge side of the compressor, adapted to connect the compressor discharge to the first heat exchanger and to disconnect the compressor discharge from the second heat exchanger when the system is heating the compartment and adapted to connect the compressor discharge to the second heat exchanger and to disconnect the compressor discharge from the first heat exchanger when the system is cooling the compartment, and a second portion having its inlet side connected to the outlet side of the first and second heat exchangers and having its outlet side connected to the intake side of the compressor, adapted to connect the compressor intake to the first heat exchanger and to disconnect the compressor intake from the second heat exchanger when the system is cooling the compartment and to connect the compressor intake to the second heat exchanger and to disconnect the compressor intake from the first heat exchanger when the system is heating the compartment;

first and second expansion valves disposed to receive high pressure refrigerant from the second and first heat exchangers, respectively, adapted to throttle the refrigerant from a high pressure to a lower pressure;

a first control valve adapted to open communication between the first expansion valve and the outlet side of the first heat exchanger when the system is heating and to close said communication when the system is cooling; and a second control valve adapted to open communication between the second expansion valve and the outlet side of the second heat exchanger when the system is cooling and to close said communication when the system is heating.

2. The air conditioning system according to claim 1 wherein refrigerant flows through said first and second heat exchangers in the same direction whether the system is operating to heat or cool the compartment.

3. The air conditioning system according to claim 1 wherein air without the compartment flows through said second heat exchanger wherein the refrigerant is heated when the system operates to heat the compartment and wherein the refrigerant is cooled when the system operates to cool the compartment.

* * * * *